Figure 1:
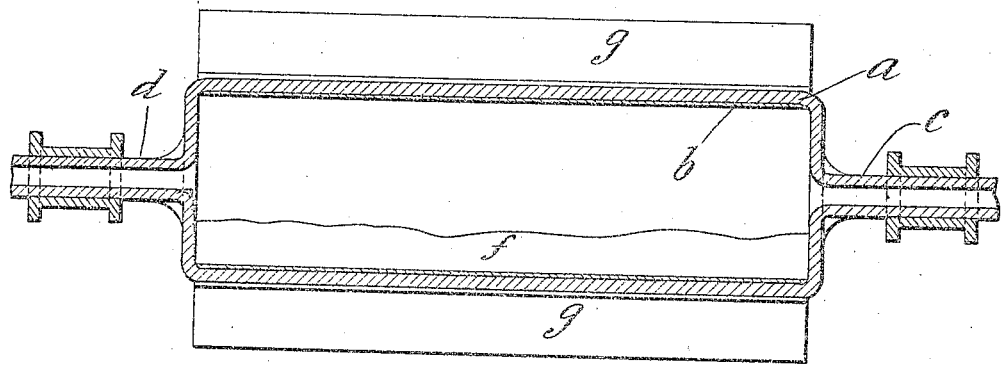

N. L. G. WHITEHOUSE.
PROCESS OF MAKING AMMONIA AND CHLORIN OR HYDROCHLORIC ACID.
APPLICATION FILED JUNE 25, 1908.

925,253. Patented June 15, 1909.

Witnesses:

Inventor
Norman L. G. Whitehouse
By James L. Norris
Atty

UNITED STATES PATENT OFFICE.

NORMAN LESLIE GRAY WHITEHOUSE, OF LEWISHAM, LONDON, ENGLAND.

PROCESS OF MAKING AMMONIA AND CHLORIN OR HYDROCHLORIC ACID.

No. 925,253.  Specification of Letters Patent.  Patented June 15, 1909.

Application filed June 25, 1908. Serial No. 440,396.

*To all whom it may concern:*

Be it known that I, NORMAN LESLIE GRAY WHITEHOUSE, a subject of the King of Great Britain, residing at 12 Lanier road, Lewisham, S. E., in the county of London, England, student, have invented certain new and useful Improvements in Processes for the Production of Ammonia and Chlorin or Hydrochloric Acid, of which the following is a specification.

It has been proposed to obtain chlorin from ammonium chlorid by heating it with a metal oxid capable of reacting with it to produce ammonia, water and chlorid of the metal, and then heating the chlorid either in steam to produce hydrogen chlorid or in air to produce chlorin. Of the oxids which have been suggested as useful for such a process only nickel oxid and magnesia come into consideration in practice. The oxids of cobalt, iron and manganese form higher oxids which oxidize ammonia at the temperature of the reaction thus causing considerable loss, unless the process is complicated by the introduction of heating in a reducing gas as a step in the cycle. Copper oxid also oxidizes ammonia.

The objections to nickel oxid are the fusibility and volatility of nickel chlorid at the temperature of the process, on the one hand necessitating the admixture of clay or the like to enable a sufficient surface to be exposed to the gases, and on the other hand entailing a loss of nickel. Magnesia has proved more or less successful, but here again the fusibility of the chlorid is a drawback and it is necessary in practice to work with an oxychlorid, which however only decomposes in air at an atmosphere so high that the vessels used are very rapidly destroyed. This last objection applies also to working with a nickel oxychlorid.

I have discovered that the oxids or oxychlorids of the rare earth metals, such as those of cerium, thorium, didymium, lanthanum or yttrium, or a mixture of such oxids or oxychlorids when mixed with ammonium chlorid and heated, readily expel ammonia and yield oxychlorids or chlorids or mixtures of these, which part with their chlorin as hydrogen chlorid if heated in steam or as free chlorin if heated in an oxidizing atmosphere, at a temperature considerably below that necessary when magnesia is used, indeed generally at a temperature below a red heat, and always below the fusing point or volatilizing point of the chlorid or oxychlorid.

Instead of mixing solid ammonium chlorid with the oxid and heating the mixture, I may pass the vapor of ammonium chlorid, or the mixture of ammonia and hydrochloric acid produced by vaporizing the chlorid, through the heated oxid, as has been done by others using metal oxids as aforesaid. In this case however, the temperature must be higher so that this procedure is not so advantageous. As, at the present time, cerium oxid is the cheapest of these rare earths, I prefer to use this material, and in the form in which it is obtainable in commerce, namely containing small proportions of other rare earths principally lanthana and didymia.

When cerium oxid is heated with ammonium chlorid at any temperature between 100° C. and 350° C., ammonia and water are expelled and a mixture of an oxychlorid and a chlorid of cerium is formed. If the mixture contains in the first instance an excess of ammonium chlorid, substantially dry, and the temperature is about 300° C., cerium chlorid $CeCl_3$ is formed and when this is subsequently heated in air at about 450° C.–500° C., it parts with two-thirds of its chlorin, forming the oxychlorid $CeOCl$. When one molecular proportion of this is heated with two molecular proportions of ammonium chlorid, ammonia and water are expelled and the chlorid $CeCl_3$ is re-formed, so that the process now becomes a cycle. It is not essential for the expulsion of the ammonia that the materials should be substantially dry; even in solution at temperatures above 100° C., a moderate evolution of ammonia is obtained.

Any suitable apparatus may be used for carrying out my invention. For instance a mixture of commercial cerium oxid (which is chiefly $CeO_2$) with about its own weight of ammonium chlorid, either substantially dry or containing water is charged into a revolving boiler which is lined with a suitable material capable of resisting the action of chlorin at temperatures below a red heat, and is adapted to be heated by hot gases passing around it or in any other suitable manner. The temperature is raised slowly or rapidly to 300° C., accordingly as much or little water is present, a current of gas, preferably free from oxygen, being blown through the boiler; the ammonia is absorbed from the gas which passes through the boiler and when no more is evolved, the temperature is raised to 450°–500° C. and air, preferably dried, is passed through the boiler as long as chlorin is evolved, the latter being absorbed from the issuing air by lime, or otherwise utilized. More ammonium chlorid, amounting to about two-thirds of the weight of the original cerium oxid, is now charged into the boiler and the operations are repeated. If, in the second operation the temperature is raised considerably higher, a larger proportion of chlorin may be obtained, but this does not compensate the additional wear of the apparatus. If steam be substituted for air, hydrogen chlorid is obtained.

Figure 2:
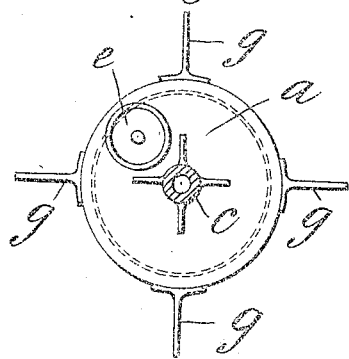

In the accompanying drawing Figure 1 is a longitudinal section and Fig. 2 an end elevation of an iron boiler $a$ having a fire-brick lining $b$ and hollow trunnions $c, d$ mounted to turn in suitable bearings. Through a manhole $e$ is introduced the mixture $f$ of cerium oxid and ammonium chlorid. The boiler is then slowly revolved while hot producer gas is blown through trunnion $c$ until the temperature within the boiler rises to about 300° C. the temperature of the producer gas and the area of the longitudinal flanges $g$ being such that the temperature cannot much exceed 300° C. The gas leaving the boiler through trunnion $d$ is treated in known manner to absorb the ammonia from it. When ammonia is no longer evolved hot air is substituted for the hot producer gas, the temperature of the air being such that the temperature of the contents of the boiler rises to and remains at about 450°–500° C., the chlorin being absorbed in known manner from the air issuing through the trunnion $d$.

Having thus described the nature of my said invention and the best means I know of carrying the same into practical effect, I claim:—

1. A process for obtaining chlorin from ammonium chlorid consisting in heating at a low temperature ammonium chlorid with an oxid of a rare earth metal, adapted to expel ammonia from ammonium chlorid at that temperature and then heating the residue at a higher temperature in an atmosphere adapted to expel chlorin from a chlorin compound of a rare earth metal at the said higher temperature.

2. The manufacture of ammonia and chlorin from ammonium chlorid by heating at a low temperature ammonium chlorid with cerium oxid whereby ammonia is expelled and then heating the residue at a higher temperature in an oxidizing atmosphere.

In testimony whereof I have signed my name to this specification in the presence of two subscribing witnesses.

NORMAN LESLIE GRAY WHITEHOUSE.

Witnesses:
   JOSEPH MILLARD,
   OLIVER IRMALL.